United States Patent [19]
Zanon

[11] Patent Number: 5,513,814
[45] Date of Patent: May 7, 1996

[54] FISHING REEL WITH COMPENSATED LINE STORAGE

[75] Inventor: Joseph Zanon, Marignier, France

[73] Assignee: Mitchell Sports, Marignier, France

[21] Appl. No.: 252,119

[22] Filed: Jun. 1, 1994

[30] Foreign Application Priority Data

Jun. 3, 1993 [FR] France .................... 93 06868

[51] Int. Cl.$^6$ .................................. A01K 89/01
[52] U.S. Cl. ........................ 242/241; 242/158 R
[58] Field of Search .................... 242/241, 242, 242/158 R, 158.1

[56] References Cited

U.S. PATENT DOCUMENTS

| 2,990,130 | 6/1961 | Pons | 242/242 |
|---|---|---|---|
| 3,055,607 | 9/1962 | Schultz | 242/242 |
| 3,119,573 | 1/1964 | Brulhart | 242/242 |
| 3,436,033 | 4/1969 | Murvall | 242/242 |
| 4,026,493 | 5/1977 | Anderson . | |
| 5,350,131 | 9/1994 | Baumgartner et al. | 242/242 |

FOREIGN PATENT DOCUMENTS

| 678728 | 1/1964 | Canada | 242/241 |
|---|---|---|---|
| 1107456 | 12/1952 | France . | |
| 1215140 | 6/1958 | France . | |
| 1299922 | 8/1961 | France . | |
| 4035846 | 6/1991 | Germany . | |
| 351820 | 4/1930 | United Kingdom . | |

Primary Examiner—Katherine Matecki
Attorney, Agent, or Firm—Foley & Lardner

[57] ABSTRACT

The reel with fixed spool and rotary line recovery device is such that the spool is mounted at the end of a spool spindle reciprocated longitudinally by a transmission system comprising a transverse slideway constrained to move with the spool spindle, a drive wheel coupled to a handle and an eccentric crank pin fastened to a satellite wheel rotating about an eccentric satellite wheel spindle on the drive wheel. The satellite wheel has a peripheral toothed ring meshing with a fixed central toothed pinion on the frame. The diameter and number of teeth of the toothed ring and the pinion are such that the satellite wheel is rotated in the same direction as the drive wheel and at twice its angular speed. The eccentric crank pin is positioned on the satellite wheel so that it has the maximal eccentricity relative to the transverse wheel spindle in both extreme positions lengthwise of the longitudinal axis of the spool spindle at which its direction of motion is reversed. The fishing line is therefore wound regularly onto the spool without significant accumulation in some areas of the spool.

5 Claims, 5 Drawing Sheets

Fig_1

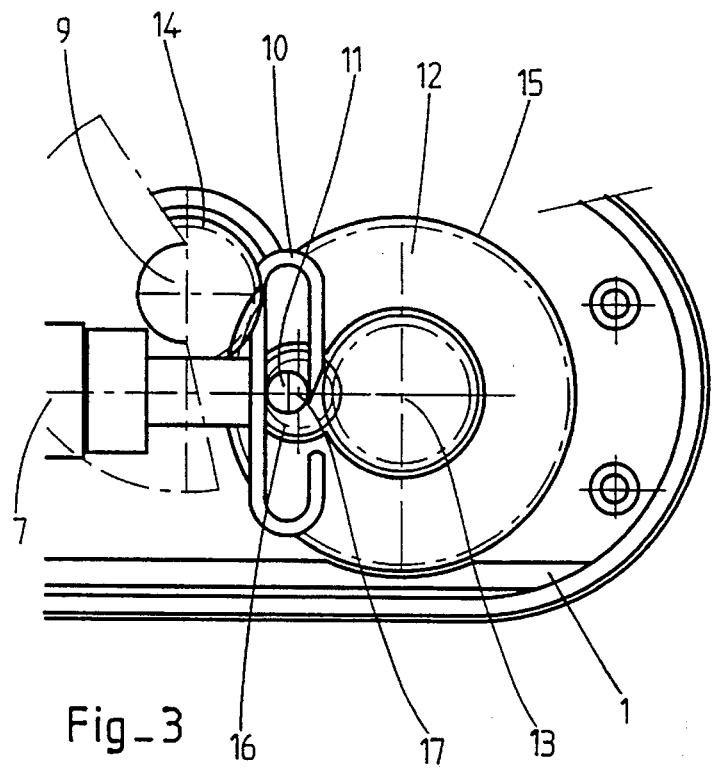
Fig_3
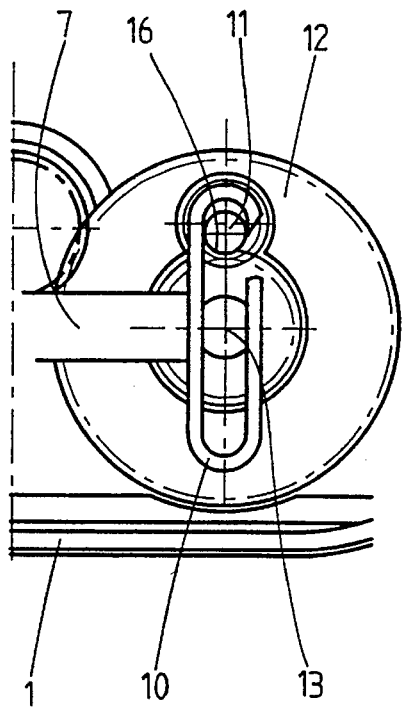
Fig_4
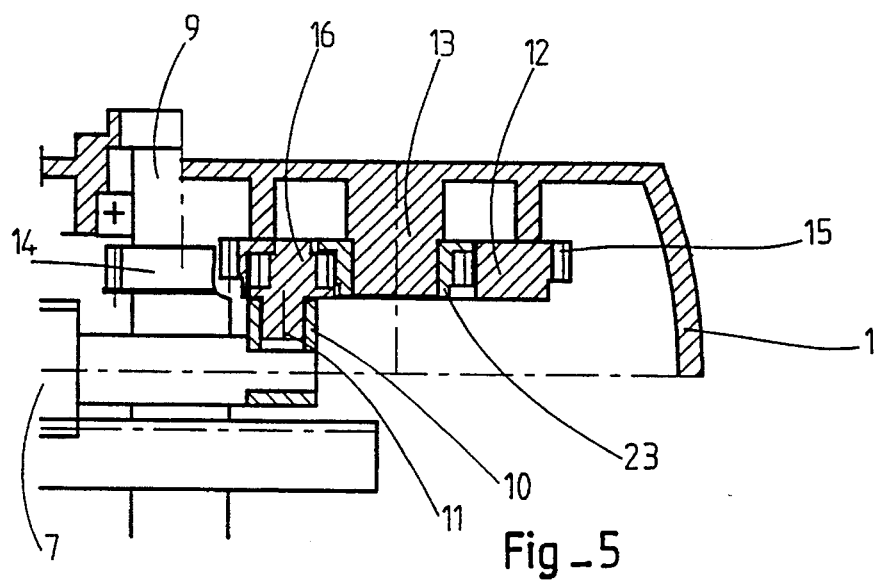
Fig_5

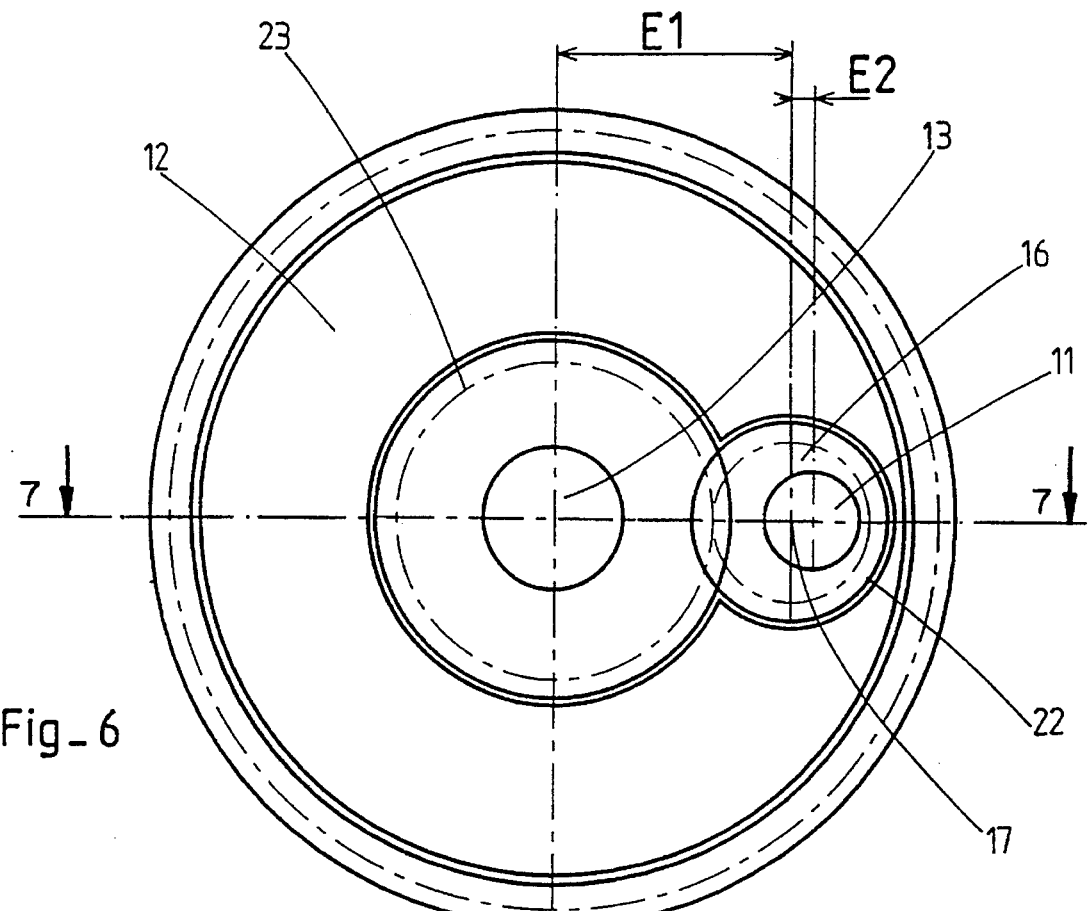
Fig_6
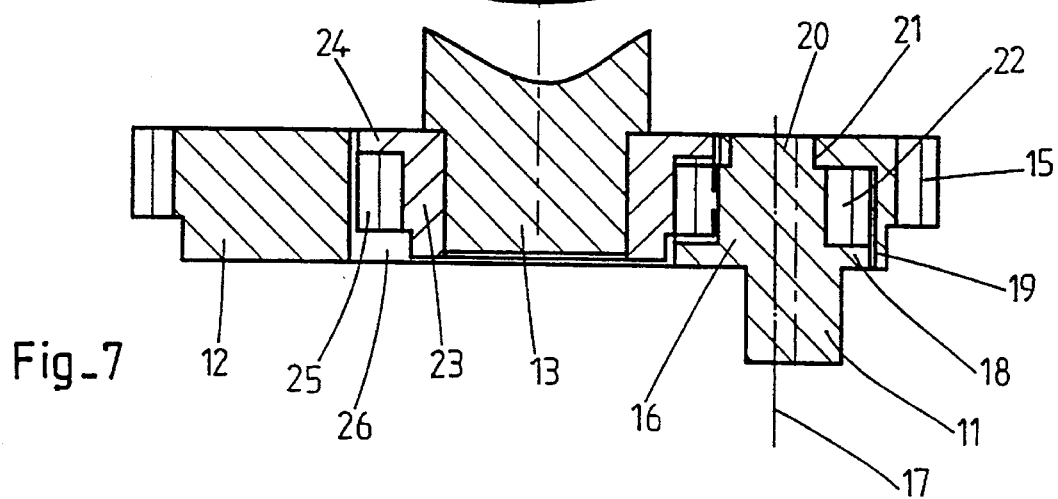
Fig_7

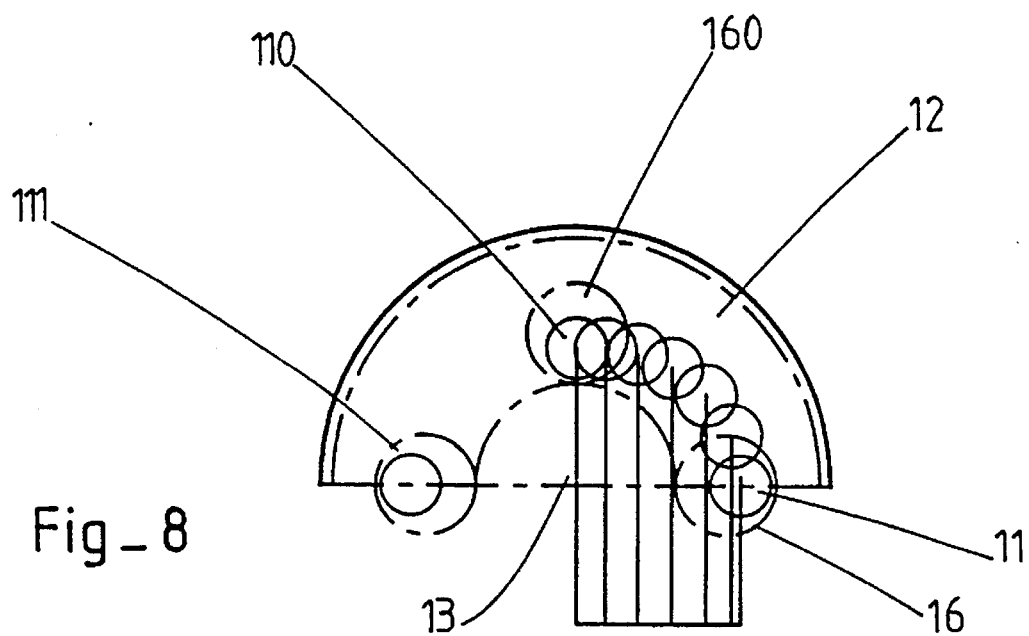
Fig_8
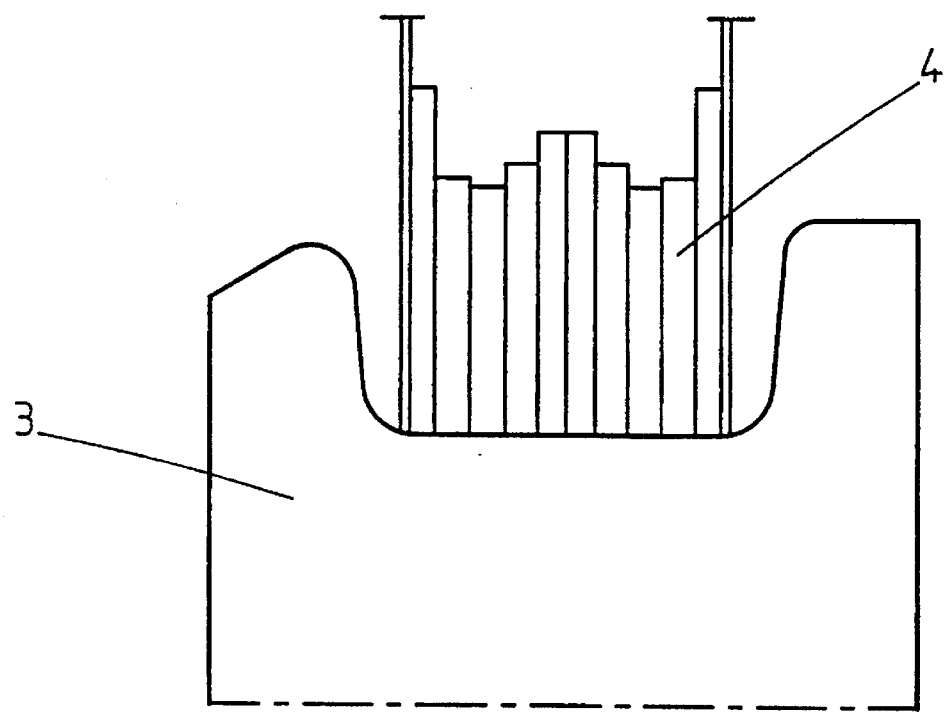
Fig_9

FISHING REEL WITH COMPENSATED LINE STORAGE

BACKGROUND OF THE INVENTION

1. Field of the Invention

The present invention concerns fishing reels with a fixed spool and a rotary line recovery device in which the line is recovered by holding the spool stationary and winding the line around the stationary spool by means of a coaxial rotary recovery device, means being provided for oscillating the spool longitudinally as the recovery device rotates to distribute the line all along the spool.

2. Description of the Prior Art

In known reels the spool is mounted at the end of a spindle which is reciprocated longitudinally between two positions at which its direction of motion is reversed by a mechanical transmission system operated by the handle of the reel.

Various mechanical transmission system designs have been put forward. That most widely used comprises a transverse slideway, constrained to move in translation with the spool spindle, and a drive wheel rotating about a transverse wheel axis and coupled to the handle; an eccentric crank pin rotates with the drive wheel and is engaged in the transverse slideway, so causing the slideway and the spool spindle to move in longitudinal translation as the handle is rotated.

The drawback of this simple eccentric transmission system is that the winding of the fishing line onto the spool is not regular: the line accumulates at the opposite ends of the spool. This accumulation of line disturbs the unspooling of the line when casting. The longer the spool, the more marked is this accumulation of line. As a result, a simple transmission system of this kind is not suited to the manufacture of a long spool fishing reel, in particular a spool whose length is greater than the diameter of its hub.

Another mechanical transmission system that can be used in long spool reels comprises a lead screw with two opposite pitch threads, disposed longitudinally in the frame of the reel and driven by a system of gears operated by the handle of the reel. A pivoting peg fastened to the spool spindle meshes with the thread of the screw. A transmission system of this kind is particularly costly because, apart from the fact that it requires the manufacture of a complex screw with two opposite threads, it requires the manufacture and assembly of the system of gears driving the screw and the pivoting peg. The manufacturing cost of a transmission system of this kind proves to be an important part of the total manufacturing cost of the reel. This design is also fragile, as the peg part engaging with the screwthread is necessarily thin. Accidental impact to the front of the spool can easily damage this peg part, which is stressed by the impact.

Another known transmission system comprises two pegs offset longitudinally on the spool spindle and bearing on opposite sides of a heart-shaped cam mounted on a drive wheel operated by the handle of the reel. A design of this kind significantly increases the overall size of the device as the drive wheel carrying the heart-shaped cam has a radius greater than the longitudinal travel of the spool spindle of the reel. This arrangement requires an unacceptable increase in the size of the frame.

More recently, document DE-A-4 035 846 has described a transmission system in which an eccentric crank pin rotating with a drive wheel operated by the handle of the reel is engaged in a transverse slideway on the spool spindle. The slideway is curved in an S-shape. The compensation achieved by the S-shape of the transverse slideway is incomplete, and the fishing line still accumulates at certain longitudinal portions of the spool.

The problem to which the present invention is addressed is that of designing a new fishing reel with transmission of longitudinal reciprocating movement to the spool spindle in which the transmission system comprises an eccentric crank pin rotating with a drive wheel and engaged in a transverse slideway of the spool spindle to define a simple, reliable and low-cost general structure and further comprising simple, reliable and low-cost means for achieving regular distribution of the fishing line between the various longitudinal portions of the spool. The invention is directed to designing a transmission system whose various component parts are exclusively driven in rotation, except for the crank pin moving in translation in the transverse slideway, in order to reduce friction and the risk of binding and wear. The transmission system must comprise a small number of component parts and its component parts must be easy to assemble, in order to reduce the manufacturing cost of the reel.

SUMMARY OF THE INVENTION

To achieve these and other objects, the invention consists in a fishing reel with fixed spool and rotary line recovery device wherein the spool is mounted at the end of a spool spindle reciprocated longitudinally between two positions at which its direction of motion is reversed by a transmission system including:

- a transverse slideway constrained to move in translation with the spool spindle,
- a drive wheel rotating about a transverse wheel spindle and coupled to a handle,
- an eccentric crank pin rotating with the drive wheel and engaged in the transverse slideway to drive the slideway and the spool spindle in longitudinal translation upon rotation of the drive wheel and the handle, wherein:

- the eccentric crank pin is disposed with a crank pin eccentricity on a satellite wheel freely rotatable on the drive wheel about a satellite wheel spindle parallel to the transverse wheel spindle and eccentric with a satellite wheel eccentricity,
- the satellite wheel is rotated about its satellite wheel spindle by satellite wheel drive means in the same direction as the drive wheel and at twice the angular speed of the drive wheel,
- the eccentric crank pin is positioned on the satellite wheel so that when the rotation spindle of the satellite wheel is in either extreme position at which its direction of motion is reversed along the longitudinal axis of the spool spindle the crank pin has the maximum eccentricity relative to the transverse wheel spindle.

The choice of the eccentricity of the satellite wheel and the eccentricity of the crank pin on the satellite wheel means that the law governing displacement of the crank pin around the transverse axis of the wheel can be varied at will, so modifying the law governing distribution of line around the spool.

To achieve good compensation for this movement of the crank pin, in order to achieve substantially regular distribution of the fishing line onto the spool, the ratio of the eccentricity of the crank pin on the satellite wheel to the eccentricity of the satellite wheel axis relative to the transverse wheel axis is advantageously between 0.07 and 0.12.

The satellite wheel drive means preferably comprise a peripheral toothed ring fastened to the satellite wheel and a toothed pinion fixed to the casing of the reel and coaxial with the transverse wheel spindle, the toothed pinion meshing with the toothed ring of the satellite wheel. The diameter and the number of teeth of the toothed pinion must be twice the diameter and twice the number of teeth, respectively, of the toothed ring of the satellite wheel.

Other objects, features and advantages of the present invention emerge from the following description of specific embodiments of the invention given with reference to the appended drawings.

BRIEF DESCRIPTION OF THE DRAWINGS

FIG. 3 is a detail side view to a larger scale showing the principal members of the transmission system according to the invention with the spool spindle advanced as far as possible.

FIG. 4 shows the FIG. 3 transmission system with the spool spindle in a median position.

FIG. 5 is a plan sectional view of the FIG. 3 transmission system.

FIG. 6 is a side view to a larger scale showing the drive wheel, the central toothed pinion and the satellite wheel with its crank pin, with the spool spindle retracted as far as possible.

FIG. 7 is a partial top view in section on the line 7—7 in FIG. 6.

FIG. 8 is a schematic side half-view showing the displacement of the crank pin over one quarter of its travel.

FIG. 9 shows the theoretical compensated distribution of the fishing line on a reel spool according to the invention, showing the difference compared to uncompensated distribution as shown in FIG. 2.

DETAILED DESCRIPTION OF THE PREFERRED EMBODIMENT

Figure 1:
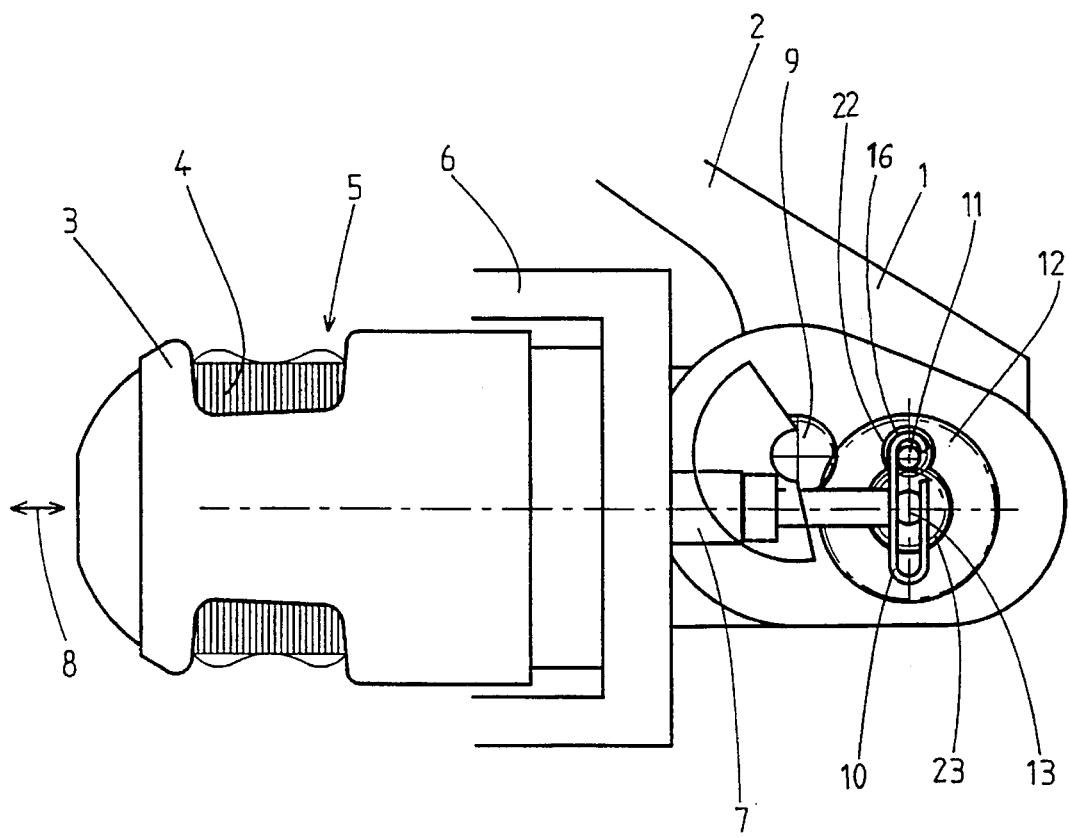
FIG. 1 is a partial general view from the side of a fishing reel in accordance with the invention, with the frame open, showing the essential members of the transmission system according to the invention.

As shown diagrammatically in FIG. 1, a fishing reel in accordance with the invention comprises a reel frame 1 usually provided with a bracket 2 for fixing it to a fishing rod, a spool 3 adapted to receive the fishing line 4 wound into the appropriate annular housing 5 of the spool, and a rotary recovery device 6 coaxial with the spool 3.

The spool 3 is mounted at the end of a coaxial spool spindle 7, reciprocated longitudinally in the frame 1 of the reel as shown by the double-headed arrow 8.

The line recovery device 6 is constrained to move in longitudinal translation with the frame 1 of the reel and rotates coaxially with the spool 3 to guide the fishing line and to wind it onto the spool 3. The recovery device 6 is rotated by a recovery device transmission system, in the known manner, driven by a handle of the reel (not shown in the figure) and rotating on a transverse handle spindle 9.

The spool spindle 7 is reciprocated longitudinally as shown by the double-headed arrow 8 by a mechanical transmission device comprising a transverse slideway 10 constrained to move in translation with the spool spindle 7 and an eccentric crank pin 11 driven by a drive wheel 12 and engaged in the transverse slideway 10.

As shown in more detail in FIGS. 3 through 7, in one specific embodiment of the invention the drive wheel 12 rotates in the reel frame 1 on a transverse wheel spindle 13. The drive wheel 12 is coupled to the reel handle by a pinion 14 meshing with peripheral teeth 15 on the drive wheel 12. The transverse wheel spindle 13 is fixed to the frame 1.

The eccentric crank pin 11 is mounted on a satellite wheel 16 which rotates freely on the drive wheel 12 about an eccentric satellite wheel spindle 17 parallel to the transverse wheel spindle 13 with a satellite wheel eccentricity E1. The eccentric crank pin 11 is mounted on the satellite wheel 16 with a crank pin eccentricity E2 relative to the satellite wheel spindle 17.

As seen more clearly in the FIG. 7 embodiment, the satellite wheel 16 is housed in an appropriate housing of the drive wheel 12, the housing being shaped to guide the satellite wheel 16 as it rotates and to support any mechanical loads imposed on the crank pin 11 in the event of impact to the spool in the axial direction of the spindle 7. The satellite wheel 16 has a smooth first guide part 18 rotating with a small clearance in a first bore 19 of the drive wheel 12 and a smooth second guide part 20 rotating with a small clearance in a second bore 21 of the drive wheel 12. The second part 20 and the second bore 21 advantageously have a smaller diameter, as shown in the figure. The intermediate part of the satellite wheel 16 includes a toothed ring 22 cut into its periphery.

The transverse wheel spindle 13 carries a toothed pinion 23 which is therefore fixedly mounted on the reel casing 1 and coaxial with the transverse wheel spindle 13. The toothed pinion 23 meshes with the toothed ring 22 of the satellite wheel 16. As shown in FIG. 7, the pinion 23 comprises a toothed central part receiving the teeth of the toothed ring 22 of the satellite wheel 16. The toothed central part is flanked by a smooth guide part 24 the same diameter as the peak diameter of the teeth 25 and by a hollowed out spindle end part 26.

The hollowed out end part 26 provides a passage for the smooth first guide part 18 of the satellite wheel 16.

In this arrangement the combination of the drive wheel 12, satellite wheel 16, toothed pinion 23 and toothed ring 22 is coplanar and housed within the overall contour of the drive wheel 12, except for the crank pin 11 which projects to engage in the transverse slideway 10. The device is therefore extremely compact.

The diameter and the number of teeth of the toothed pinion 23 are twice the diameter and twice the number of teeth, respectively, of the toothed ring 22 of the satellite wheel 16. Thus when the drive wheel 12 rotates the satellite wheel 16 meshing with the fixed central toothed pinion 23 is rotated about its satellite wheel spindle 17 in the same direction as the drive wheel 12 and at twice the angular speed of the drive wheel.

The movement of the crank pin 11 is therefore the result of combining two rotation movements, firstly rotation movement of the drive wheel 12 around its transverse wheel spindle 13 and secondly rotation movement of the satellite wheel 16 about its satellite wheel spindle 17 which itself rotates about the transverse wheel spindle 13. FIG. 8 shows this movement over one quarter of the travel.

Note in the figures that the eccentric crank pin 11 is positioned on the satellite wheel 16 so that when the rotation axis of the satellite wheel is in either extreme position along the longitudinal axis of the spool spindle 7 the crank pin 11 has its maximal eccentricity relative to the transverse wheel spindle 13. These extreme positions are those shown in FIG. 6 and FIG. 3, for example: in FIG. 6 the satellite wheel 16 is opposite the spool and the crank pin 11 is opposite the transverse wheel spindle 13 relative to the satellite wheel spindle 17. In FIG. 3, on the other hand, the satellite wheel 16 is nearest the spool of the reel along the spool spindle 7, the crank pin 11 being still opposite the transverse wheel spindle 13 relative to the satellite wheel spindle 17.

Referring to FIG. 8, consider first the initial position of the crank pin 11, the extreme retracted position, on the righthand side of the figure. By rotating the handle the drive wheel 12 and the satellite wheel 16 are rotated. After one quarter-turn of the drive wheel 12 the satellite wheel 16 assumes the position 160 and the crank pin 11 assumes the position 110 nearest the transverse wheel spindle 13. Between the initial position and the position 160 the crank pin 11 progressively approaches the transverse wheel spindle 13, as shown in the figure. The other portions of the travel are effected similarly, the crank pin 11 moving progressively away from the transverse wheel spindle 13 between the position 160 and the advanced second extreme position 111 shown in dashed line. The second half of the travel is symmetrical to the first half.

The non-circular travel of the crank pin 11 compensates storage of the line on the spool. This compensation depends on the chosen values for the eccentricity E1 of the satellite wheel 16 and the eccentricity E2 of the crank pin 11 on the satellite wheel 16. Good compensation can be achieved by choosing a ratio between the eccentricity E2 and the eccentricity E1 between about 0.07 and 0.12.

Figure 2:
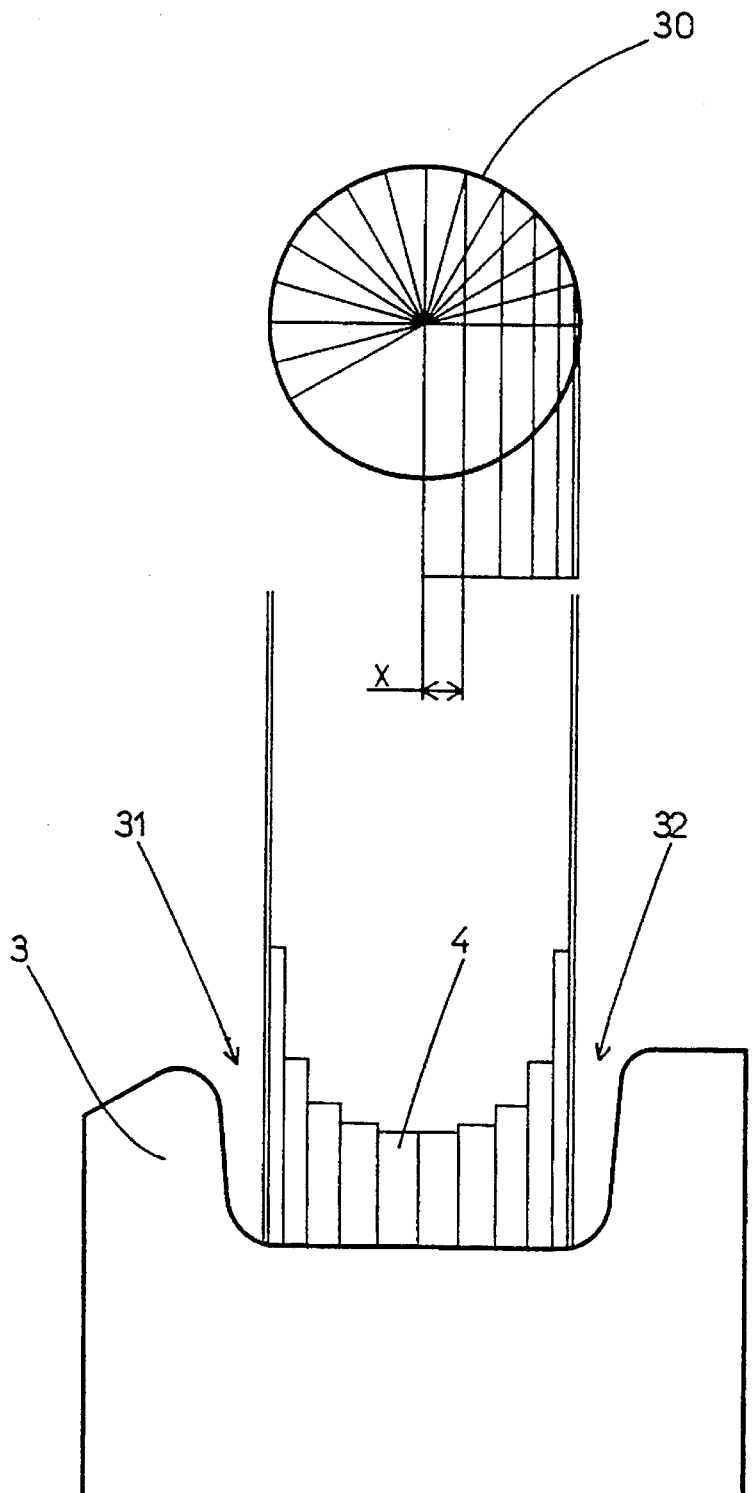
FIG. 2 shows the theoretical defects in the distribution of the fishing line on a spool in a reel with transmission of movement by an eccentric crank pin moving in a circle.

To understand the effect of the invention, see FIGS. 2 and 9.

FIG. 2 shows by means of the curve 30 a path of circular displacement of the eccentric crank pin 11 corresponding to conventional driving arrangements with a constant eccentricity crank pin. Note that the spool spindle 7 moves at a relatively high speed in its intermediate position but at a relatively low speed near its two extreme positions at which its direction of motion is reversed, corresponding to the ends 31 and 32 of the spool 3. As the rotation of the recovery device 6 is constant, the fishing line 4 tends to accumulate at the ends 31 and 32 of the spool 3, as shown in FIG. 2.

FIG. 9 shows the distribution of the line with a movement of the crank pin as shown in FIG. 8, i.e. in accordance with the invention. Note that the line is distributed much more regularly than in FIG. 2, having two maxima near the ends and a maximum in the central area, the amplitudes of these maxima being not much different than the mean amplitude with which the line 4 is wound onto the spool 3.

In fact the amplitude variations have been exaggerated in FIG. 9. In practise these variations are small and this results in regular winding of the line which does not disrupt subsequent unwinding of the line from the spool.

These advantageous effects are obtained according to the invention using only rotary parts, to the exclusion of any parts moving in translation or sliding parts, except for the sliding movement of the crank pin 11 in the transverse slideway 10.

The present invention is not limited to the embodiment specifically described but includes variant executions and generalizations thereof within the scope of the following claims.

There is claimed:

1. Fishing reel driven by a handle comprising:

a reel frame;

a spool spindle reciprocated longitudinally in said reel frame between two positions at which the direction of motion of said spool spindle is reversed;

a fixed spool, mounted at an end of said spool spindle and coaxially with said spool spindle;

a rotary line recovery device mounted coaxially with said spool for guiding fishing line onto said spool; and a transmission system, for longitudinally reciprocating said spool spindle, including:
   a transverse slideway which moves in translation with said spool spindle,
   a transverse wheel spindle fixed to said reel frame,
   a drive wheel rotating about said transverse wheel spindle and fixed to said handle,
   a satellite wheel spindle parallel to said transverse wheel spindle and mounted eccentrically on said drive wheel,
   a satellite wheel freely rotatable on said drive wheel about said satellite wheel spindle,
   an eccentric crank pin eccentrically mounted on said satellite wheel and having a maximum eccentricity relative to said transverse wheel spindle when said eccentric crank pin is positioned along the longitudinal axis of said spool spindle and engaged in said transverse slideway to drive said slideway and said spool spindle in longitudinal translation upon rotation of said drive wheel,
   satellite wheel drive means for rotating said satellite wheel about said satellite wheel spindle in the same direction as said drive wheel and at twice the angular speed of said drive wheel.

2. Reel according to claim 1 wherein the ratio between the eccentricity of said crank pin on said satellite wheel and the eccentricity of said satellite wheel spindle relative to said transverse wheel spindle is between approximately 0.07 and 0.12.

3. Reel according to claim 1 wherein said satellite wheel drive means comprise:

a toothed ring fastened to said satellite wheel, a toothed pinion fixed to said casing of said reel and coaxial with said transverse wheel spindle and meshing with said toothed ring of said satellite wheel, said toothed pinion having a diameter and a number of teeth twice the diameter and the number of teeth, respectively, of said toothed ring of said satellite wheel.

4. Reel according to claim 3 wherein:

said toothed pinion has a central pinion toothed part, said central part being flanked by a smooth guide part having the same diameter as the peak diameter of said teeth and by a hollowed out spindle end part, said toothed ring of said satellite wheel is cut into the periphery of said satellite wheel and is flanked by a smooth first guide part engaging in said hollowed out spindle end part and rotating in a first bore of said drive wheel and a smaller diameter part rotating in a second bore of said drive wheel.

5. Reel according to claim 4 wherein the combination of said drive wheel, satellite wheel, toothed pinion and toothed ring is coplanar and accommodated within the overall contour of said drive wheel except for said crank pin which projects to engage in said transverse slideway.

* * * * *